310-369 SR

11/26/85 XR 4,555,718

United States Patent [19]

Aiba et al.

[11] Patent Number: 4,555,718

[45] Date of Patent: Nov. 26, 1985

[54] PIEZO ACTIVATED PUMP IN AN INK LIQUID SUPPLY SYSTEM

[75] Inventors: Masahiko Aiba, Nara; Masaaki Kuranishi, Yamatokoriyama; Hideyuki Miyake, Nara, all of Japan

[73] Assignee: Sharp Kabushiki Kaisha, Osaka, Japan

[21] Appl. No.: 572,054

[22] Filed: Jan. 19, 1984

[30] Foreign Application Priority Data

Jan. 25, 1983 [JP] Japan .................................. 58-11042

[51] Int. Cl.[4] .............................................. G01D 15/18

[52] U.S. Cl. ................................ 346/140 R; 310/369; 346/75; 417/322

[58] Field of Search .................. 346/75, 140; 417/322, 417/394, 389, 478; 310/369, 346

[56] References Cited

U.S. PATENT DOCUMENTS 3,150,592 9/1964 Stec ...................................... 417/322

3,215,078 11/1965 Stec ...................................... 417/322

4,344,743 8/1982 Bessman .......................... 417/322 X 4,389,657 6/1983 McMahon ........................... 346/140

*Primary Examiner*—Joseph W. Hartary

*Attorney, Agent, or Firm*—Birch, Stewart, Kolasch & Birch

[57] ABSTRACT

A piezo activated liquid supply pump system includes a cylinder shaped vibration pipe made of a piezo element, and a cone shaped pressure chamber surrounded by a rubber wall. The cone shaped pressure chamber is disposed in the cylinder shaped vibration pipe in a manner that a cavity is formed therebetween. Polyethylene glycol is filled in the cavity for transferring the vibration of the piezo element to the rubber wall of the cone shaped pressure chamber. The volume of the pressure chamber varies in response to the vibration of the piezo element to achieve the liquid supply. The cone configuration of the pressure chamber ensures an effective removal of air bubbles from the pressure chamber. The cavity is communicated with a buffer chamber so as to introduce the polyethylene glycol into the buffer chamber when the liquid contained in the pressure chamber freezes, whereby the expansion of the pressure chamber caused by the freezing of the liquid is absorbed.

4 Claims, 4 Drawing Figures

PRIOR ART

PIEZO ACTIVATED PUMP IN AN INK LIQUID SUPPLY SYSTEM

BACKGROUND OF THE INVENTION

1. FIELD OF THE INVENTION

The present invention relates to a pump system in a liquid supply system and, more particularly, to a piezo activated pump system in an ink liquid supply system for an ink jet system printer of the charge amplitude controlling type.

2. DESCRIPTION OF THE PRIOR ART

An ink jet system printer of the charge amplitude controlling type requires a small amount, constant flow rate pump system in order to ensure stable printing operation even when the ambient condition varies.

The conventional ink liquid supply system in an ink jet system printer of the charge amplitude controlling type employs a mechanical plunger pump of the constant flow rate type. However, the mechanical plunger pump does not ensure stable constant flow rate supply when the supply amount is very little. Furthermore, the mechanical plunger pump occupies a considerably large size.

To ensure stable constant flow rate supply even when the supply amount is very little, a piezo activated pump system has been proposed, wherein an piezo element is employed to vary the size of a pump chamber. An example of the piezo activated pump system is described in copending U.S. Patent Application, "INK LIQUID SUPPLY SYSTEM IN AN INK JET SYSTEM PRINTER OF THE CHARGE AMPLITUDE CONTROLLING TYPE", Ser. No. 510,355, filed on July 1, 1983 by Masaaki KURANISHI, Masahiko AIBA, Hideyuki MIYAKE and Naohiro OKU, and assigned to the same assignee as the present application. The Japanese counterpart is Japanese Patent Application No. 57-118240 filed on July 6, 1982; the British counterpart was filed on July 1, 1983 and assigned application No. 8317915; the German counterpart was filed on July 6, 1983 as P 33 24 397.2; and the Canadian counterpart was filed on July 5, 1983 and assigned Ser. No. 431,844.

In the piezo activated pump system describe in the abovementioned copending application, the pressure chamber is defined by a cylinder shaped piezo element. Therefore, the pressure chamber configuration is fixed to the cylinder shape. The cylinder configuration precludes effective removal of air bubbles from the pressure chamber when the air bubbles are included in the ink liquid supplied to the piezo activated pump system.

Furthermore, the pressure chamber surrounded by the piezo element mey explode when the ink liquid contained in the pressure chamber freezes. This is because the thin piezo element can not endure the expansion of the ink liquid when the ink liquid freezes. The freezing of the ink liquid will take place when the ink jet system printer is placed in a non-operating condition or when the ink jet system printer is transported from one office to another one in a low temperature atmosphere.

OBJECTS AND SUMMARY OF THE INVENTION

Accordingly, an object of the present invention is to provide a novel piezo activated pump system suited for an ink liquid supply system to an ink jet system printer of the charge amplitude controlling type.

Another object of the present invention is to provide a piezo activated pump system which ensures effective bubble removal from the pressure chamber.

Still another object of the present invention is to protect the piezo activated pump system from explosion when the ink liquid contained in the pressure chamber freezes.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a cylinder shaped vibration pipe is formed by a piezo element. A cone shaped pressure chamber formed by rubber is disposed in the cylinder shaped vibration pipe. Liquid such as a polyethylene glycol is disposed between the cylinder shaped vibration pipe and the cone shaped pressure chamber to transfer the vibration of the piezo element to the pressure chamber. The cone configuration of the pressure chamber facilitates the removal of bubbles from the ink liquid disposed in the pressure chamber.

In a preferred form, a buffer chamber is provided, which is selectively communicated with the liquid disposed between the cylinder shaped vibration pipe and the cone shaped pressure chamber via a valve. When the ink jet system printer is placed in a non-operating condition for a long period, the valve is opened to allow the liquid to flow toward the buffer chamber. Under these conditions when the ink liquid disposed in the pressure chamber freezes, the pressure chamber expands. The expansion of the pressure chamber is absorbed by the buffer chamber because the liquid disposed between the vibration pipe and the pressure chamber flows into the buffer chamber, thereby protecting the piezo activated pump from explosion even when the ink liquid disposed in the pressure chamber freezes.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
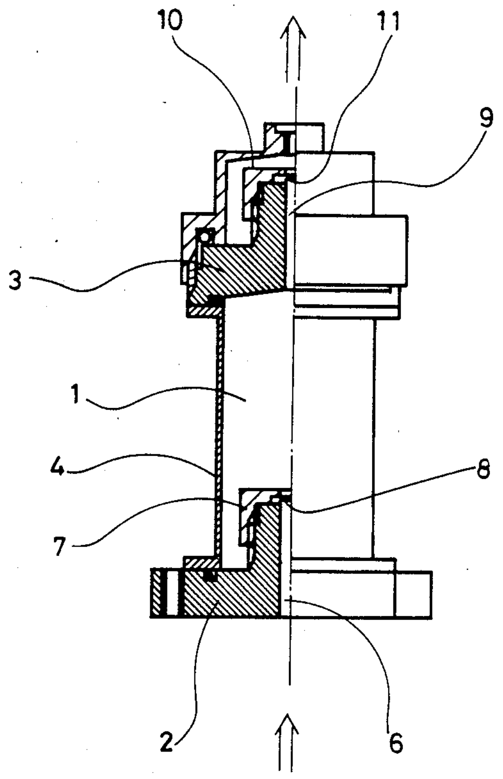
FIG. 1 is a partially sectional front view of a piezo activated pump system of the prior art.

FIG. 1 shows a conventional piezo activated pump system which is described in copending U.S. Patent Application Ser. No. 510,355.

The conventional piezo activated pump system includes a pressure chamber 1 which introduces and develops ink liquid in the direction shown by arrows. The pressure chamber 1 includes a side wall formed by a cylinder shaped vibration pipe 4 made of a piezo element. A valve seat 2 is secured to one end of the cylinder shaped vibration pipe 4, and another valve seat 3 is secured to the other end of the cylinder shaped vibration pipe 4. An inlet valve 8 is secured to the valve seat 2 by means of a valve guard 7 to selectively connect the pressure chamber 1 to an inlet passage 6. An outlet valve 11 is secured to the valve seat 3 by means of a valve guard 10 so as to selectively connect the pressure chamber 1 with an outlet port via an outlet passage 9.

The cylinder shaped vibration pipe 4 has a thickness of about 0.2 mm. When a pulse signal is applied to the cylinder shaped vibration pipe 4, the volume of the pressure chamber 1 varies to supply the ink liquid in the direction shown by the arrows. The piezo activated pump system ensures a constant flow rate supply in a small amount supply.

The vibration pipe 4 must be the cylinder shape in order to ensure an effective vibration of the piezo element. Thus, the pressure chamber 1 of the conventional system must be the cylinder shape. The cylinder configuration precludes an effective removal of air bubbles from the pressure chamber 1 when the air bubbles are contained in the ink liquid introduced into the pressure chamber 1. Furthermore, when the ink liquid filled in the pressure chamber 1 freezes while the ink jet system printer is placed in a non-operating condition, there is a possibility that the piezo activated pump system explodes due to the expansion of the ink liquid because the vibration pipe 4 is considerably thin.

Figure 2:
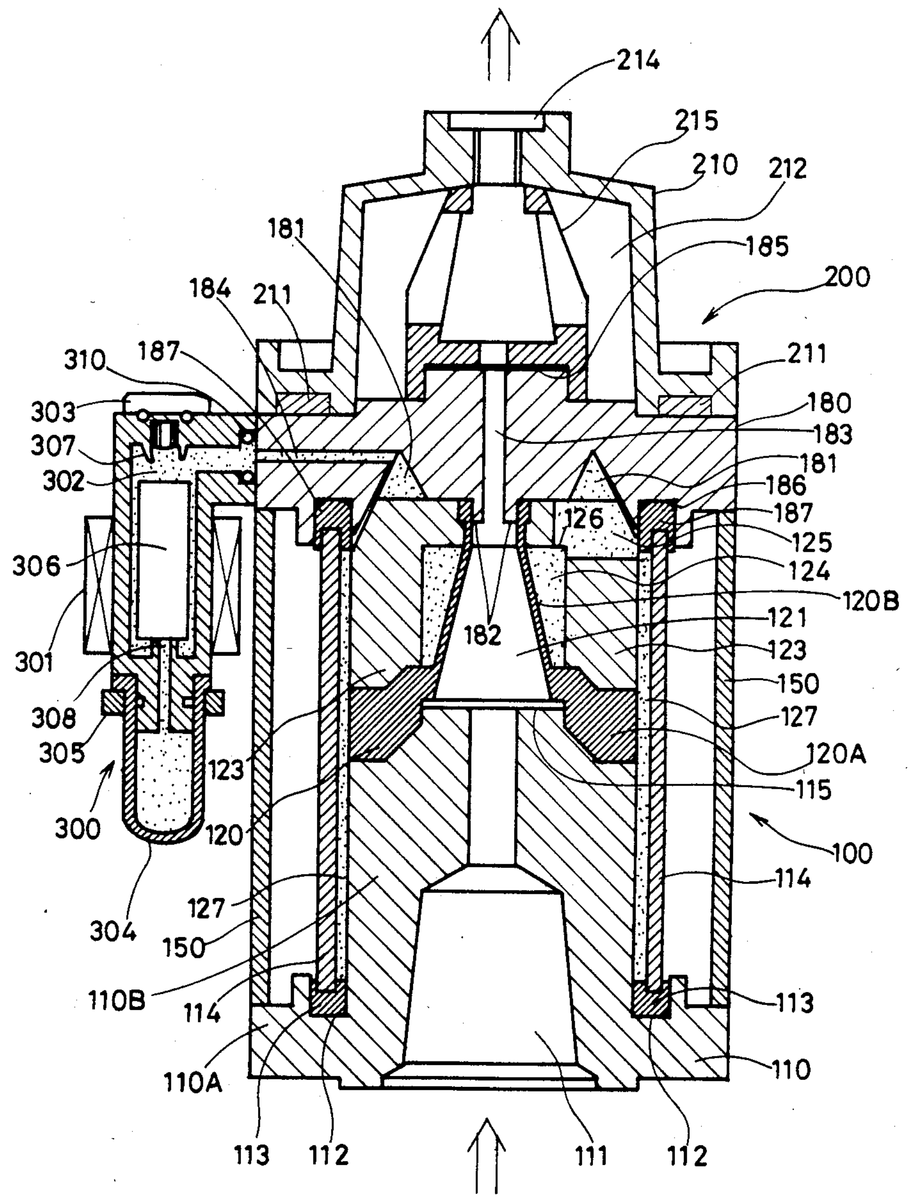
FIG. 2 is a sectional view of an embodiment of a piezo activated pump system of the present invention.
Figure 3:
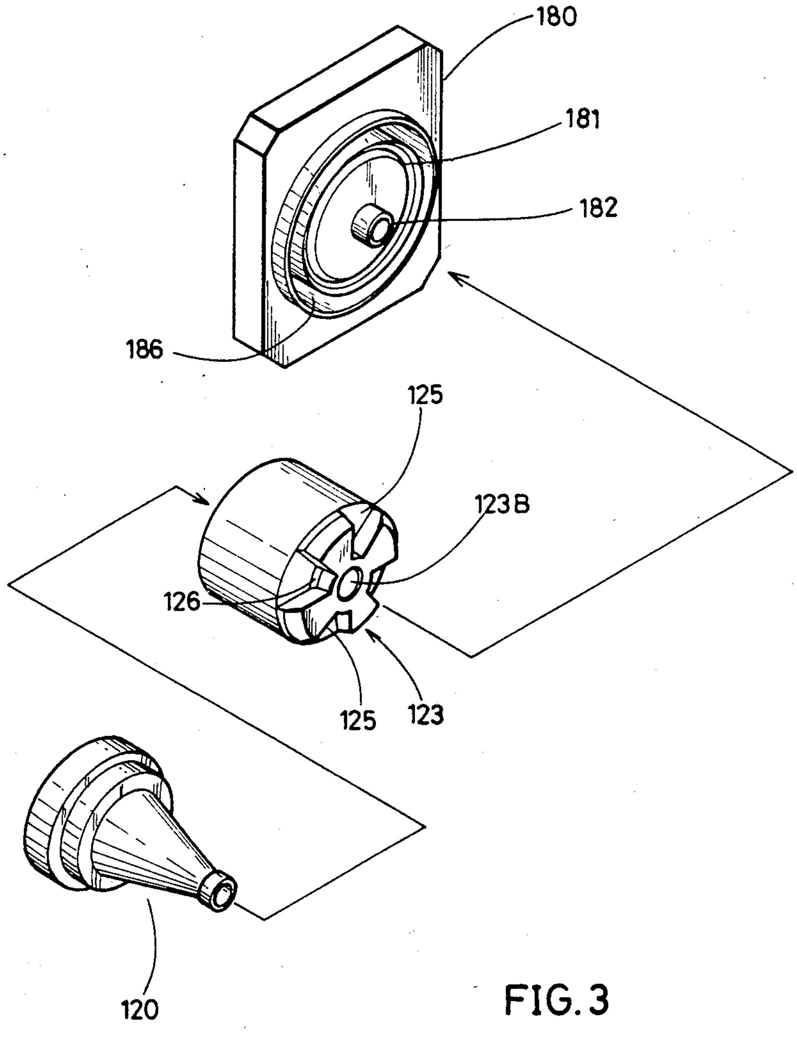
FIG. 3 is an exploded perspective view of an essential part of the piezo activated pump system of FIG. 2.

FIGS. 2 and 3 show an embodiment of a piezo activated pump system of the present invention, which includes a pressurizing pump unit 100, a ripple regulating unit 200, and a buffer unit 300. The pressurizing pump unit 100 includes an inlet valve seat 110, an outlet valve seat 180, and a cylinder shaped frame 150 disposed between the inlet valve seat 110 and the outlet valve seat 180. The ripple regulating unit 200 includes a frame 210 which is secured to the outlet valve seat 180 through the use of screws. The buffer unit 300 is secured to the side of the outlet valve seat 180 through the use of screws.

The inlet valve seat 110 is provided with an inlet passage 111 formed through the center of the valve seat 110. The inlet passage 111 is connected to an ink liquid reservoir (not shown) in order to introduce the ink liquid into the piezo activated pump system. A circular shaped groove 112 is formed at a flange portion 110A of the inlet valve seat 110. A rubber seal 113 is disposed in the circular shaped groove 112.

A cylinder shaped vibration pipe 114 made of a piezo element is disposed on the circular shaped groove 112 with the intervention of the rubber seal 113. A cavity 127 is formed between the cylinder shaped vibration pipe 114 and a body portion 110B of the inlet valve seat 110. A plate shaped check valve 115 is disposed on the body portion 110B of the inlet valve seat 110 so as to cover the inlet passage 111. A cone shaped separator rubber 120 is secured to the body portion 110B of the inlet valve seat 110 in order to define a pressure chamber 121 which is communicated with the inlet passage 111 through the plate shaped check valve 115.

The cone shaped separator rubber 120 is preferably made of EPDM rubber, for example, "D1418" expressed by the ASTM standard. The cone shaped separator rubber 120 integrally includes a base portion 120A which has the same diameter as the body portion 110B of the inlet valve seat 110, and a cone portion 120B which has a thin wall to define the cone shaped pressure chamber 121. The cone configuration of the pressure chamber 121 ensures an effective bubble removal from the pressure chamber 121 when air bubbles are included in the ink liquid supplied from the inlet passage 111 of the pressure chamber 121. The cone shaped separator rubber 120 vibrates in response to the vibration of the cylinder shaped vibration pipe 114, thereby varying the volume of the pressure chamber 121.

A separator cap 123 made of resin is disposed on the base portion 120A of the cone shaped separator rubber 120 in a manner to surround the cone portion 120B of the cone shaped separator rubber 120. The separator cap 123 includes a hole 123B, as shown in FIG. 3, in which the tip end of the cone portion 120B of the cone shaped separator rubber 120 is engaged. A hollow portion 124 is formed between the outer surface of the cone shaped separator rubber 120 and the inner surface of the separator cap 123. Four cutaway portions 125 are formed on the upper surface of the separator cap 123. Passages 126 are formed at the cutaway portions 125 in order to communicate the cutaway portion 125 with the hollow portion 124. The outlet valve seat 180 is disposed on the separator cap 123.

The outlet valve seat 180 is provided with a circular shaped groove 186 at the position confronting the circular shaped groove 112 formed in the inlet valve seat 110. A rubber seal 187 is disposed in the circular shaped groove 186. The upper end of the cylinder shaped vibration pipe 114 is supported by the circular shaped groove 186 with the intervention of the rubber seal 187. The above-mentioned cavity 127 is continuously formed around the body portion 110B of the inlet valve seat 110, the base portion 120A of the cone shaped separator rubber 120, and the separator cap 123.

Another circular shaped groove 181 of a shorter diameter is formed in the outlet valve seat 180. An outlet passage 183 is formed through the center of the outlet valve seat 180. A protruded portion 182 is formed on the bottom surface of the outlet valve seat 180 at the position where the outlet passage 183 is formed, the protruded portion 182 being inserted into the hole 123B of the separator cap 123 and connected to the upper end of the cone shaped separator rubber 120. The circular shaped groove 181 is communicated with the cutaway portions 125 of the separator cap 123 so that the circular shaped groove 181 is communicated with the cavity 127 and the hollow portion 124. The circular shaped groove 181 is connected to a passage 184 formed in the outlet valve seat 180. The buffer unit 300 communicates with the passage 184. A plate shaped check valve 185 is disposed on the outlet valve seat 180 to cover the outlet passage 183. The cylinder shaped frame 150 is disposed between the inlet valve seat 110 and the outlet valve seat 180 to surround the cylinder shaped vibration pipe 114 with a clearance therebetween.

The thus constructed pressurizing pump unit 100 introduces the ink liquid from the inlet passage 111 into the cone shaped pressure chamber 121 defined by the cone shaped separator rubber 120 and the outlet passage 183. The volume of the cone shaped pressure chamber 121 varies by the deformation of the cone portion 120B of the cone shaped separator rubber 120, whereby the ink liquid is developed from the cone shaped pressure chamber 121 through the plate shaped check valve 185.

A liquid having a low freezing point, such as polyethylene glycol, is filled in the circular shaped groove 181, the cutaway portions 125, the hollow portion 124 and the cavity 127.

The frame 210 of the ripple regulating unit 200 is secured to the outlet valve seat 180 via a rubber seal 211 to form a chamber 212 therein. At the upper end of the frame 210, an outlet 214 is formed which is connected to a nozzle unit of an ink jet system printer. The frame 210 is made of a resilient member, for example, polyacetal resin. The resilience functions to regulate the ripples included in the pressurized ink liquid. A valve guard 215 is disposed in the chamber 212 in order to depress the plate shaped check valve 185. The resilient ripple regulating unit 200 effectively regulates the ripples even when the piezo element (cylinder shaped vibration pipe 114) is activated by a drive signal of 122 Hz.

The buffer unit 300 is secured to the side wall of the outlet valve seat 180 by screws in a manner that the passage 184 formed in the outlet valve seat 180 communicates with a valve chamber 302 associated with an electromagnetic valve 301. A rubber seal 310 ensures a tight connection between the buffer unit 300 and the outlet valve seat 180. A buffer bag 304 is provided at the bottom of the buffer unit 300. The buffer bag 304 is made of EPDM rubber of ASTM standard, "D1418". More specifically, the buffer bag 304 is secured to the body of the buffer unit 300 by means of a fastener 305 in a manner that the buffer bag 304 communicates with a passage 308 formed in the body of the buffer unit 300. A liquid introducing opening 307 is formed at the upper end of the valve chamber 302 in order to introduce the liquid which should be filled in the hollow portion 124 and the cavity 127. The liquid introducing opening 307 is closed by a screw cap 303. When the plunger 306 is located at the uppermost position in the valve chamber 302, the liquid introducing opening 307 is closed, and the valve chamber 302 is communicated with the buffer bag 304 through the passage 308. When the plunger 306 is located at the lowest position in the valve chamber 302, the passage 308 is closed, and the liquid introducing opening 307 is communicated with the valve chamber 302.

That is, when the main power supply switch of the ink jet system printer is switched on, the electromagnetic valve 301 is activated to hold the plunger 306 at the lowest position.

Accordingly, when the ink jet system printer is placed in an operating condition, the passage 308 is closed by the plunger 306. When the main power supply switch is switched off, the plunger 306 is shifted to the uppermost position by a spring (not shown) so as to open the passage 308. When the liquid is desired to be introduced through the liquid introducing opening 307, the plunger 306 is depressed downward against the spring to create a negative pressure within the valve chamber 302, the circular shaped groove 181, the cutaway portions 125, the hollow portion 124 and the cavity 127.

As already discussed above, when the main power supply switch of the ink jet system printer is switched on, the electromagnetic valve 301 is enabled to close the passage 308 through the use of the plunger 306. Thus, the liquid is sealed in the valve chamber 302, the hollow portion 124 and the cavity 127. Under these conditions, when the drive signal of 122 Hz is applied to the cylinder shaped vibration pipe 114 made of the piezo element, the vibration of the cylinder shaped vibration pipe 114 is transferred to the cone portion 120B of the cone shaped separator rubber 120 via the liquid filled in the cavity 127, the cutaway portions 125 and the hollow portion 124. The cone portion 120B of the cone shaped separator rubber 120 repeats the stretching vibration in response to the vibration of the cylinder shaped vibration pipe 114. In this way, the pressurized ink liquid is developed from the pressure chamber 121 to the chamber 212 via the plate shaped check valve 185, and the ink liquid is introduced from the inlet passage 111 into the pressure chamber 121 via the plate shaped check valve 115. The ripple included in the pressurized ink liquid is minimized in the chamber 212, and the ink liquid is applied to the nozzle unit of the ink jet system printer through the outlet 214.

When the ink jet system printer is placed in a non-operating condition, the plunger 306 is located at the uppermost position by means of the spring. The passage 308 is opened so that the valve chamber 302 is communicated with the buffer bag 304 through the passage 308. Under these conditions, when the ink liquid siposed in the pressure chamber 121 freezes, the volume of the pressure chamber 121 increases. The expansion of the pressure chamber 121 pushes the liquid filled in the hollow portion 124 toward the valve chamber 302 via the cutaway portions 125, the circular shaped groove 181, and the passage 184. Further, the liquid flows toward the buffer bag 304 which functions to absorb the expansion of the pressure chamber 121.

The liquid filled in the cavity 127, the hollow portion 124 and the valve chamber 302 is preferably the polyethylene glycol #200, and must satisfy the following conditions.

(1) The volume variation depending on the temperature must be minimum. This is because the liquid must accurately transfer the vibration of the cylinder shaped vibration pipe 114 to the cone shaped separator rubber 120 without regard to the temperature variation.

(2) The liquid must show the antifreezing characteristics. (The polyethylene glycol has the freezing point of about −70° C.) The water-color ink used in the ink jet system printer has the freezing point about −5° C. The liquid must function to abosorb the expansion when the water-color ink freezes.

(3) The liquid must show a low viscosity. The low viscosity ensures a stable transfer of the vibration of the cylinder shaped vibration pipe 114 to the cone shaped separation rubber 120.

(4) The liquid must have a low saturation vapour pressure. (The polyethylene glycol has the saturation vapour pressure of about $10^{-2}$ Torr at 25° C.) The low saturation vapour pressure ensures the stable transfer of the vibration from the cylinder shaped vibration pipe 114 to the cone shaped separator rubber 120.

The cone shaped separator rubber 120 should preferably have the same vibration transferring characteristics as the piezo element, and must have the resilience. The "D1418" of the ASTM standard shows the resilience of about 270 mm$^3$ when the thickness is about 0.3 mm, and the stiffness is 50°.

Figure 4:
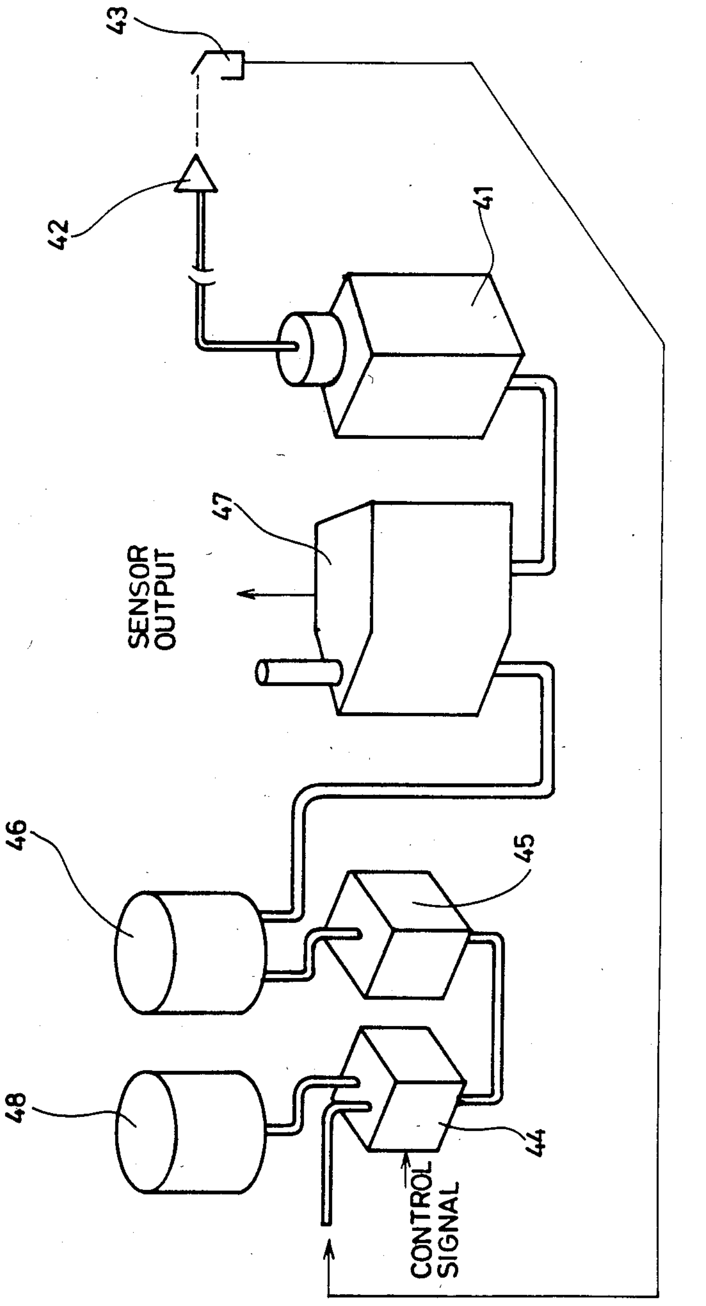
FIG. 4 is a schematic block diagram of an ink liquid supply system for an ink jet system printer of the charge amplitude controlling type, including the piezo activated pump system of FIG. 2.

FIG. 4 shows an ink liquid supply system for an ink jet system printer of the charge amplitude controlling type, which includes the piezo activated pump system of FIGS. 2 and 3.

A piezo activated pump system 41 of the construction shown in FIGS. 2 and 3 is connected to a nozzle unit 42 in order to supply the nozzle unit 42 with a pressurized water-color ink. The ink liquid emitted from the nozzle unit 42 is used to print desired symbols on a record receiving paper in a dot matrix fashion. The ink liquid not contributing to the actual printing operation is directed to a beam gutter 43. The ink liquid collected by the beam gutter 43 is returned to an ink tank 46 via an electromagnetic cross valve 44 and a suction pump 45. The ink tank 46 is connected to the piezo activated pump system 41 via an ink viscosity sensor unit 47. When the viscosity of the ink liquid is higher than a preselected level, the ink viscosity sensor unit 47 develops a sonsor output to activate the electromagnetic cross valve 44 so that the dilution is supplied from a dilution tank 48 to the ink liquid supply system. At this moment, the beam gutter 43 is disconnected from the suction pump 45.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer comprising:

an ink liquid reservoir containing water-color ink;

a liquid supply pump system connected to introduce said water-color ink from said ink liquid reservoir, and developing a pressurized ink liquid;

first conduit means, disposed between said ink liquid reservoir and said liquid supply pump system, for supplying said water-color ink to said liquid supply pump system; and second conduit means for supplying said pressurized ink liquid developed from said liquid supply pump system to a nozzle unit, said liquid supply pump system comprising:

a cylinder shaped vibration pipe;

a cone shaped pressure chamber surrounded by a resilient member, said cone shaped pressure chamber being diposed in said cylinder shaped vibration pipe in a manner that a cavity is formed between said cylinder shape vibration pipe and said resilient member;

an inlet passage connected to said first conduit means;

an inlet valve disposed at said inlet passage;

an outlet passage connected to said second conduit means;

an outlet valve disposed at said outlet passage; and a vibration transferring liquid filled in said cavity formed between said cylinder shaped vibration pipe and said resilient member.

2. The ink liquid supply system of claim 1, wherein said vibration transferring liquid has a freezing point lower than that of said water-color ink.

3. The ink liquid supply system of claim 2, said liquid supply pump system further comprising:

a buffer chamber communicated with said cavity so as to introduce said vibration transferring liquid from said cavity; and valve means, disposed between said buffer chamber and said cavity, for selectively connecting said buffer chamber to said cavity.

4. The ink liquid supply system of claim 3, wherein said valve means comprises an electromagnetic valve which is closed to disconnect said buffer chamber from said cavity when the liquid supply pump system is activated.

* * * * *